Figure 1:
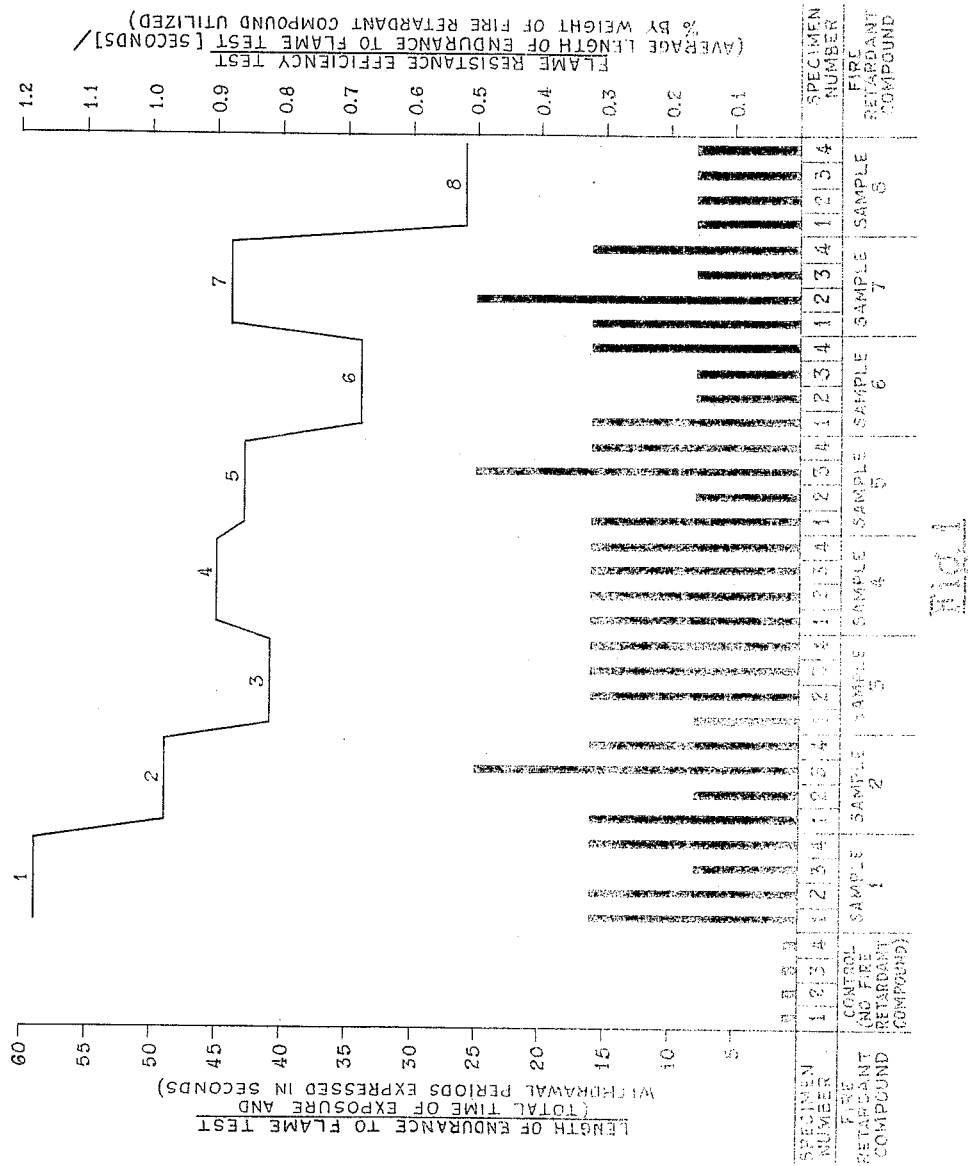

United States Patent Office 3,247,134
Patented Apr. 19, 1966

3,247,134
FIRE RETARDANT CELLULAR POLYURETHANE
COMPOSITIONS CONTAINING AN ORGANIC
PHOSPHATE AMINE SALT
Charles C. L. Hwa and Paul Robitschek, Granville, Ohio,
assignors to Owens-Corning Fiberglas Corporation, a
corporation of Delaware
Filed July 9, 1962, Ser. No. 208,230
4 Claims. (Cl. 260—2.5)

The present invention relates to fire retardant compositions and particularly to fire retardant cellular polyurethane compositions which contain an organic phosphate salt of an amine.

The ever expanding applications of cellular polyurethanes have served to extend the utilization of these materials into such diversified areas as cushioning structures, vibration dampeners, thermal insulation, sprayed coatings, filters, packaging materials and structural units. Attending the wide and rapid expansion is an intense desire for enhanced fire retardancy which is not provided in a practical form by conventional, existing fire resistant additives as a result of their tendency to retard or affect the fabrication and foaming processes, and to degrade the properties of the ultimate foamed product.

The efforts to combat the combustibility of polyurethane foams have been numerous, varied in approach and without exception, productive of results which were detrimental, or at best of extremely limited value. For example, an early expedient comprised the utilization of additional quantities of plasticizers possessing a flame retardant property such as tris(chloroethyl)phosphate. However, this technique resulted in mechanically weakened foams plagued by humidity inspired shrinkage and expansion and severe diminution of the degree of fire retardance upon aging, due to the volatile nature of the plasticizer-fire retardant. Other attempts to employ halogenated compounds as fire retardant co-reactant additives in foaming compositions such as by the use of chlorendic acid, demonstrated that quantities of these compounds yielded foams so viscous that their handling properties by the use of conventional process apparatus, was extremely difficult or impossible. It was also proposed to employ small quantities of diammonium phosphates or organic compounds of a similar nature, but the proposal met with failure due to the insolubility of such compounds in the resin reactants and their consequent precipitation which resulted in the clogging of the processing equipment, the failure to impart the desired resistance and an inhomogeneity or discontinuous achievement of any degree of flame retardancy which was realized.

It is an object of the present invention to provide economical polyurethane foams exhibiting a high degree of fire retardancy without the sacrifice of extant desirable properties.

A further object is the provision of methods for the preparation of fire retardant polyurethane foams which are devoid of processing detriments and which yield products possessing both the desirable attributes of conventional polyurethane foams and an unusual degree of fire retardancy.

Another object is the provision of methods for the preparation of polyurethane foams through the addition of small quantities of compositions which serve to greatly enhance the fire retardancy of the resultant products without significantly diminishing the humidity resistance or other desirable qualities of such products.

Still another object is the provision of fire retardant polyurethane foams which contain organic phosphate amine salts.

Another object is the provision of flame retardant polyurethane foams which contain halo alkyl phosphate alkanol amine salts.

A further object is the provision of halo alkyl phosphate alkanol amine salts, and of a method for their preparation.

The term "polyurethane" as employed throughout the specification and claims is intended to connote those resins formed by the reaction of polyisocyanates or polyisothiocyanates with organic compounds containing two or more active hydrogens such as phenols, amines, hydroxylic and carboxylic compounds, and particularly polyesters and polyethers. Reference to cellular foams of such polyurethanes embraces those resins which are characterized as containing voids or pores which may be separate or interconnected and are formed by conventional techniques which are amply taught by the prior art, and include expansion methods involving fluid induced cell formation, pore forming processes wherein soluble materials are washed or leached from the resinous structure to leave pores or voids, and the like.

Figure 2:
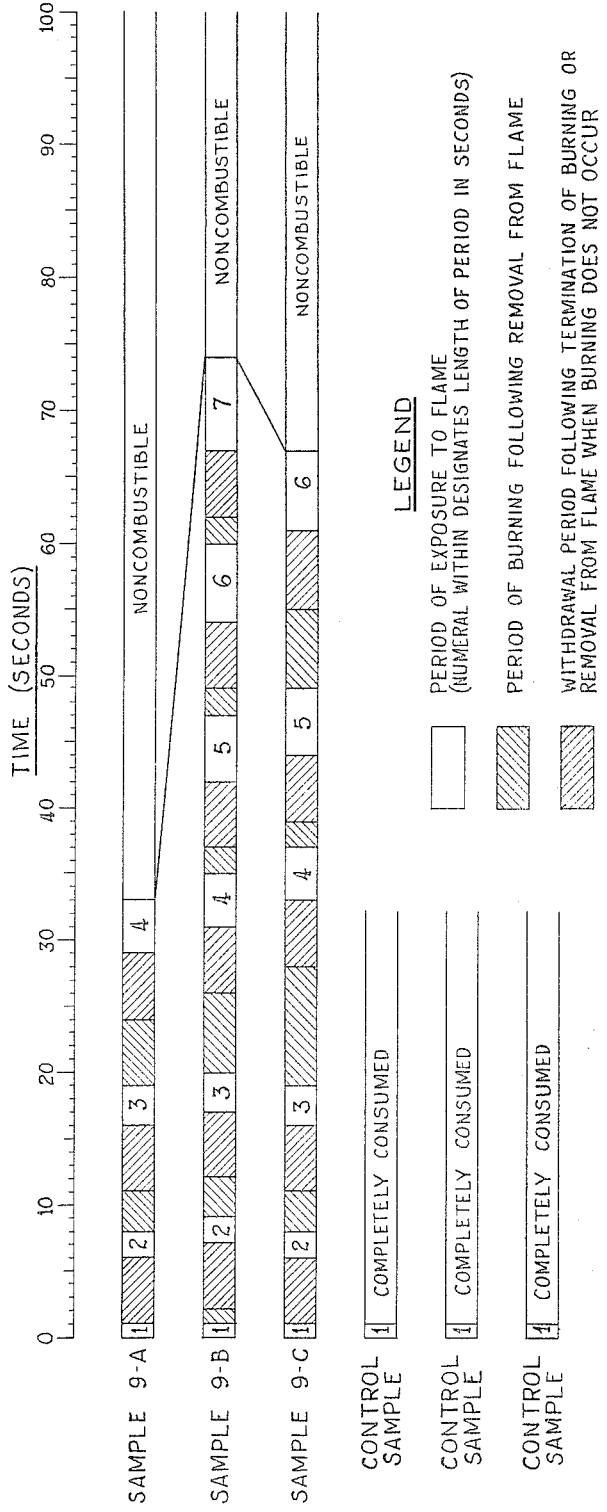

In the drawing, FIGURE 1 embodies graphs illustrating the degree of fire retardancy achieved with the inventive materials in polyether based polyurethane foams, as reflected by endurance to a flame test, and the fire retardancy efficiency of the inventive materials, as a function of the fire resistance achieved and the quantity of the inventive materials employed, and FIGURE 2 is a chart depicting the fire retardance and ultimate noncombustibility realized with the inventive materials and polyester based polyurethane resins.

The foregoing objects are achieved by means of the addition of organic phosphate amine salts to polyurethane cellular compositions in quantities sufficient to impart a fire retardant effect.

I. FIRE RETARDANT COMPOUNDS

Specifically, the improved products and methods of the present invention are derived from and comprise, the addition of liquid organic phosphate amine salts having the following general formula, to polyurethane foam components:

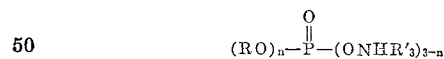

in which R is alkyl, cycloalkyl, aryl, aralkyl, halo alkyl or halo aryl, R' is hydroxy alkyl, hydrogen or alkyl, $n$ is an integer having a value of 1 to 2 and particularly those compounds in which R is halo alkyl and R' is hydroxy alkyl.

The synthesis of organic phosphate amine salts may be broadly described as a reaction between an organo phosphorous compound and an amine, or alkanol or alkyl substituted amino compound, such as a neutralization reaction between an alkyl acid phosphate and an amino alcohol. In such a reaction the organic segment of the phosphate, which may be aliphatic or aromatic, and the alkanol, hydrogen and/or alkyl substituents of the nitrogen atom should be selected to yield the desired, corresponding R and R' groups. The general type of reaction is amply disclosed by U.S. 2,676,122 and G. M. Kosolapoff's "Organophosphorus Compounds," page 220, John Wiley & Sons, Inc., 1950, and methods for the synthesis of the novel halo alkyl phosphate alkanol amine salts of the invention will be subsequently described.

The prescribed organic phosphate amine salts comprise the products of reactions between a primary or secondary ester of an acid phosphate or mixtures of the primary and secondary esters of such a phosphate, and an amine.

The mono- and di-alkyl acid phosphates and mixtures thereof, include simple alkyl acid phosphates such as methyl, ethyl, propyl, butyl and higher alkyl containing acid phosphates, as well as cycloalkyl acid phosphates such as ethylene cyclophosphate, glyceryl cyclophosphate and the like. In addition, the described amine salts may be prepared from halo alkyl acid phosphates such as 2-chloroethyl acid phosphate, 2,3-dichloropropyl acid phosphate, 2-bromoethyl acid phosphate, 2,3-dibromopropyl acid phosphate and the like. Also suitable are aryl acid phosphates, halo aryl phosphates and mixed acid phosphates such as phenyl acid phosphate, cresyl acid phosphate, t-butyl acid phosphate, 2,4,6-trichlorophenyl acid phosphate, 2,4,6-tribromophenyl acid phosphate, 2,4-dichlorophenyl acid phosphate, 2,4-dibromophenyl acid phosphate, methyl-phenyl, propyl 2-chloroethyl, butyl-2-4-dichlorophenyl acid phosphates, and the like.

Typical of suitable primary, secondary and tertiary amine and alkanolamine reactants in the prescribed salt formation are:

Primary methyl amine
Secondary methyl amine
Tertiary methyl amine
Primary ethyl amine
Secondary ethyl amine
Tertiary ethyl amine
Primary propyl amine
Secondary propyl amine
Tertiary propyl amine
Monoethanolamine
Diethanolamine
Triethanolamine
Dimethyl ethanolamine
N,N-diethyl ethanolamine
N-aminoethyl ethanolamine
N-methyl diethanolamine
Monoisopropanolamine
Diisopropanolamine
Triisopropanolamine
Morpholine
N-methyl morpholine
N-hydroxyethyl morpholine
N-ethyl morpholine
N-ethyl diethanolamine
Di(2-ethylhexyl)ethanolamine
N-butyl ethanolamine
N,N-dibutyl ethanolamine
Dibutyl isopropanolamine
N,N-diisopropanolamine
2,6-dimethyl morpholine
N-phenyl morpholine
Phenyl ethanolamine
Phenyl diethanolamine
Phenylethyl ethanolamine as well as alkylene oxide adducts of alicyclic and aromatic amines such as ethylene or propylene oxide adducts, and morpholine, piperidine and aniline adducts, and the like.

II. PREPARATION OF FIRE RETARDANT CELLULAR POLYURETHANE COMPOSITIONS

The fire retardant compounds of the invention may be merely added to the reactants utilized to prepare the desired foam, or to one or both of the reactants prior to the admixture and reaction of the ingredients of the reaction batch.

In a preferred practice, a two component system comprising a prepolymer or a diisocyanate as the first component, and the polyhydroxy compounds corresponding to the prepolymer, the fire retardant amine salt and a catalyst as the second component, are utilized and admixed for reaction. In addition, a blowing agent and/or a surfactant may be added to either component.

In such a prepolymer system, a portion of the polyhydroxy compound is prereacted with all of the diisocyanate to form a composition in which a portion of the diisocyanate linkages have been converted to other types of linkages, and preferably to urethane linkages. Such prepolymer systems are desirable because of the fact that the isocyanate reaction experienced during foaming is of a more controllable and less exothermic nature. Although the polyhydroxy compound utilized in the prepolymer normally corresponds to the polyhydroxy compound embodied in the second reactive component, the two compounds may differ. Similarly, while a variety of di- and poly-isocyanates may be employed, toluene diisocyanate, comprising a mixture of 2,4- and 2,6-toluene diisocyanate, is preferred.

The polyhydroxy compounds may vary greatly in respect to chemical structure and function. Polyhydroxy compounds having a low concentration of hydroxyls, such as the dihydroxy compounds, are suitable for the production of flexible or semi-flexible foams and normally have a hydroxyl number below 150. Hydroxy compounds having hydroxyl numbers of around 300, such as tri- and higher hydroxy compounds, normally yield semi-rigid or rigid foams. The hydroxy compounds may comprise the polyesterification reaction products, e.g., the reaction product of adipic acid and trimethylol propane. Such polyesters may include carboxyl groups, which are normally present in a relatively small proportion. Polyethers are also suitable reactants, e.g., the etherification product of propylene oxide with a polyhydroxy compound such as glycerol or sorbitol and with itself. While polyhydroxy compounds which are polymeric in nature are normally employed, unreacted polyhydroxy compounds such as glycerol, trimethylol propane or the addition product of propylene oxide and ethylene diamine may be included as a part of the foaming composition, or used in the formation of prepolymers.

As previously mentioned, foam formation may be facilitated by the use of a blowing agent or may result from carbon dioxide formation caused by the reaction of the isocyanate with a calculated water content of the reaction mixture. In the absence, or in supplementation of, the latter reaction, a substantially inert, low-boiling material capable of volatilizing in the presence of the heat generated by the foaming reaction may be used. While chloro-trifluoromethane is preferred, amines such as N-methyl morpholine, tin or cobalt salts, or the like, may be utilized in the catalysis of the isocyanate-hydroxyl reaction. Surfactants, and preferably organosilicon fluids, may also be employed to control cell structure and size in the foaming process.

In respect to the condition of the fire retardant compounds as embodied in the cellular compositions, it should be observed that their function as an additive or a reactant cannot be precisely and definitely prescribed. When the fire retardant compounds contain normally functional sites such as the functional or free hydroxy groups of the alkanolamine salts, it is relatively certain that the salt becomes a part of the polymer through reaction and linkage with the diisocyanate through the functional site. While there is no evidence concerning the reactivity of amine salts through the amine hydrogens with compounds such as diisocyanates, it is feasible that such reactivity may exist or be induced. Consequently, it is probable that the compositions of the invention which possess normally reactive or functional sites might be characterized as reactants and ultimate constituents of the polymer which comprises the structure of the cellular compositions, and that other compounds may not be positively or readily categorized as reactants or additives. It is feasible that the unusual improvement in terms of both fire retardancy and the maintenance of processing and ultimate product characteristics of the derived cellular compositions, is a direct result of the reactivity of the fire retardant compounds and the consequent integrity of the foam-fire retardant system and the continuity of the fire retarding effect. It is also possible that if a chemical interreaction between foam and fire retardant is not realized, the improved results may stem from the high degree of compatibility between the organic foams and the fire retardants which have a major organic phase present in at least two terminal or pendent positions and simultaneously provide the fire resistance of the inorganic phosphorous or halogen constituents or substituents. It should also be noted that it is feasible to achieve the in situ formation of the amine salt fire retardant compounds within the cellular compositions or their reactants prior to resin or foam formation, by conducting the prescribed method of salt formation in the basic foam admix, in one of the reactants employed in the preparation of the foam, or by adding the amine salt reactants individually to the reactants of the resin and achieving both the salt and resin or foam synthesis by the same admixture and reaction step.

III. DEGREE OF FIRE RETARDANCY ACHIEVED

In appraising the degree of fire retardancy realized with the compositions and methods of the invention, the analysis was extended to both polyether and polyester based polyurethane foams and was designed to yield comparative data in respect to cellular compositions which were identical except for the incorporation of the present fire retardant compounds. In addition, the effects stemming from the utilization of varying quantities of the fire retardant compounds and the consequent efficiency in terms of the degree of fire retardancy achieved per unit of fire retardant compound employed, were determined. During the derivation of the data relating to the fire retardant effect, a phenomenon of conduct on the part of the polyester based polyurethane resins was observed and special test methods and means of graphic representation were employed to fully illustrate this condition.

The degree of fire retardancy achieved with the amine salt fire retardants is depicted by FIGURE 1 which expresses the fire retardancy of the samples in terms of the total length of their endurance (in seconds) to the flame test which will be hereafter described.

In testing the fire retardancy of polyether based polyurethane foams containing organophosphate amine salts, 6″ x 2″ x 1″ samples of the foam were cured at 160° F. for a period of two hours. The cured samples were then held one inch above the flame overlap of a Bunsen burner having a 3½″ flame and a 1″ cone. At the onset of the test the sample is exposed to the flame for a period of 1 second and then withdrawn for a period of five seconds. This step is repeated without interruption with the period of each consecutive exposure to the flame increased by one second but the period of withdrawal maintained at 5 seconds following each exposure to the flame. Accordingly, the test comprises the following steps: sample exposed to the flame for one second, withdrawn for five seconds, exposed for two seconds, withdrawn for five seconds, exposed for three seconds, etc. The prescribed test is continued until such time as the foam sample is ignited and fails to extinguish itself during the five second period of withdrawal from the flame.

In obtaining the results expressed by FIGURE 1, the fire retardant materials of Table I below, were incorporated in the same polyether based polyurethane foam, by the same technique, and a sample of the same foam without a fire retardant compound was employed as the control:

TABLE I

| Sample Number | Fire Retardant Compound Comprising Reaction Product of— | | Percent by Weight of the Fire Retardant Compound Contained by the Cellular Composition |
|---|---|---|---|
| | Organophosphorus Compound | Amino Compound | |
| 1 | Chloroethyl Acid Phosphate | Diethanolamine | 11.9 |
| 2 | ___do___ | ___do___ | 16.5 |
| 3 | Methyl Acid Phosphate | ___do___ | 17.1 |
| 4 | ___do___ | ___do___ | 17.8 |
| 5 | ___do___ | Triethanolamine | 19.0 |
| 6 | n-butyl Acid Phosphate | Diethanolamine | 17.7 |
| 7 | Chloroethyl Acid Phosphate | Triethanolamine | 18.2 |
| 8 | n-butyl Acid Phosphate | Ammonia | 15.3 |

The general method of the synthesis of the organophosphate amine as set forth in the second column of Table I has been previously discussed, is amply described in the existing art, and specific preparations of certain haloalkyl phosphate alkanolamine compounds will be subsequently described. The quantities of fire retardant compound embodied in the last column of Table I are percentages by weight of such compounds, based upon the total weight of fire retardant compound and polyurethane resin, exclusive of catalyst, surfactants or diluents.

Referring to FIGURE 1, it may be noted that four specimens of each sample, including the control, were subjected to the described flame test. The lengths of endurance are represented by the vertical plots and include the total time in seconds during which each specimen endured the test without burning beyond the extent of the five second withdrawal period, and does not include the final withdrawal period for each specimen during which the specimen ignited and failed to be extinguished. The numerical designation of the endurance (in seconds) may be determined from the scale at the left of the graph. For example, specimen 1 of sample 1 is shown to have endured a 16 second total endurance comprising a 1 second exposure, a 5 second withdrawal, a 2 second exposure, a 5 second withdrawal and a 3 second exposure, to yield a total of 16 seconds. During the next 5 second period, the specimen supported combustion and failed to extinguish itself prior to the termination of that period.

From FIGURE 1, it may be perceived that all of the control specimens were ignited by a mere 1 second exposure to the flame and failed to extinguish the combustion during the succeeding 5 second period of withdrawal. In contrast, the inventive specimens all endured a total treatment of between 8 to 25 seconds, with an average endurance for the samples of some specimens exceeding 16 seconds and with 60% of the samples exhibiting an endurance of 16 or more seconds. Consequently, all of the samples of the invention exhibit endurance or resistance to the composite conditions of flames, temperature, ignition and the prolonged support of combustion once ignition is achieved, which is from 8 to 25 times as great as that of foams which are bereft of the inventive concepts.

While the data embodied by the vertical plots in FIGURE 1 is indicative of the improved characteristics of the modified polyurethane foams, it does not clearly demonstrate the precise efficiency of the individual samples. For example, a cursory examination of the vertical plots of FIGURE 1 would indicate that samples 2, 5 and 7 are the most effective fire retardant compounds. However, this is not the case, due to the fact that the values plotted vertically in FIGURE 1 merely illustrate the over-all endurance of the specimens without regard to the quantity of the fire retardant compound which is necessary to achieve such endurance. Consequently, a second series of horizontal plots comprising the flame resistance efficiency of the different fire retardant compounds has been derived and may be measured against the scale appearing at the right of the figure. This plot is a flame resistance efficiency index derived by dividing the average length of endurance (in seconds) to the flame test of the four test specimens of each sample, by the percentage by weight of the fire retardant compound which was embodied in that particular foam sample. For example, 11.9% by weight of the reaction product of chloroethyl acid phosphate and diethanolamine were incorporated in foam sample 1 and the average endurance of the four specimens of sample 1 was 14 seconds, to yield a flame resistance efficiency index of 1.18. From the efficiency index plot it may be noted that the fire retardant-foam systems in order of decreasing efficiency are 1, 2, 4, 7, 5, 3, 6 and 8.

In respect to the quantity of fire retardant compound added to the foams, it may be noted that between 10–20% by weight were employed in samples 1–8 and in samples 9a–c which will be subsequently discussed. Other tests have involved quantities of fire retardant in the range of 30–40%, but quantities of these compounds in excess of 60% by weight yield deleterious effects. By this it is meant that the latter quantities cause a weakening of the cellular structure and may impair the foamability of the basic reaction mixture in causing the cells to collapse. However, if the latter characteristics are acceptable in the final product, such large quantities may be employed. Consequently, the fire retardant compounds are preferably employed in a quantity equal to less than 60% of the total weight of resinous foam and fire retardant compound.

The foamed polyurethane resins employed in the preparation of samples 1–8 and in deriving the data embodied in FIGURE 1, were prepared by the previously described two component system wherein a first component comprising a sorbitol polyether polyurethane prepolymer, and a second component containing the corresponding sorbitol polyether polymer, toluene diisocyanate and the fire retardant compound were admixed and expanded by conventional methods. After expansion, the foams were cured at 160° F. for 2 hours. The control sample was identical except for the omission of a fire retardant compound.

Specifically, the cellular compositions were prepared by admixing and expanding: (1) a first component comprising 10 parts by weight of chloro-trifluoromethane, and 100 parts by weight of the prepolymer having an NCO:OH ratio of 4.5 and prepared by reacting toluene diisocyanate with a polyether having a hydroxyl number of 650, a viscosity of 115,000 cps. at 25° C. (Hoeppler), a theoretical molecular weight of 530, an acid number of 0.30, a maximum water content of 0.10 and a normal ash content of 0.0025; and (2) a second component comprising 47 parts by weight of the polyether employed in the preparation of the prepolymer of the first component, 20 parts by weight of chloro-trifluoromethane, 0.5 part by weight of tetramethyl 1,3-butane diamine. To the second component of this cellular composition were also added the amine salts (1–8) of Table I, in the quantities specified in the final column of that table, to yield corresponding foam samples 1–8.

It should also be noted that the described polyether based polyurethane foams comprising samples 1–8, demonstrated unusual water resistance. Specimens of each sample were immersed in water under pressure adequate to maintain them beneath the surface of the water, and after three months thus submerged at room temperature, the specimens displayed no visible distortion or disruption and after being dried overnight they appeared less friable than unsoaked samples of the control foam composition.

As previously mentioned, the fire or flame resistance or retardancy of polyester based polyurethane cellular compositions containing organophosphate amine salts were different from, and in certain respects superior to, the results achieved with polyether based resins. In order to demonstrate this distinction and the phenomenon and improvement noted, a slightly modified flame test was employed and the data derived therefrom is illustrated by FIGURE 2.

Specifically, it was observed that the polyester based cellular compositions derived a noncombustible nature after undergoing a period of exposure to the flame test. Consequently, the test was slightly modified in that the same sequence and method of exposures to the flame was employed, i.e., one second, two seconds, three seconds, etc., but the samples were permitted to burn until they had become extinguished and the five second period of withdrawal prior to reexposure was observed after the termination of combustion. After sustaining a limited degree of combustion a black, surface crust was formed and thereafter the samples could be continually exposed to the flame for as much as 60 seconds without igniting or dripping. Thus it may be seen that unlike the polyether-based foams, the polyester-based foams exceeded mere fire retardance and achieved a secondary phase of noncombustibility.

To indicate the method of the test and the result derived, sample 9 comprising a polyester based polyurethane foam containing 10.2% by weight of chloroethyl acid phosphate diethanolamine was prepared and three specimens of the sample were subjected to the described test. As illustrated by FIGURE 2, the three specimens (9–a, b and c) experienced alternating conditions of exposure to the flame (increased by one second at each occurrence), withdrawal from the flame, and after some exposures to the flames, burning. In all cases, the samples become noncombustible and nonignitable, apparently after surface modifications occasioned by burning or combustion. Sample 9–a became noncombustible after four exposures to the flame for a total exposure time of 10 seconds, while samples 9–b and 9–c required 6 exposures for 21 seconds, and 5 exposures for 15 seconds, respectively. In contrast to the fire retardancy and ultimate noncombustibility of samples 9a, b and c, it should be noted that the control samples were immediately ignited upon exposure to the flame for a period of 1 second and were entirely consumed without extinguishing themselves.

The two component, prepolymer and polymer preparation method employed for samples 1–8 was also employed for sample 9. The polyester polymers and prepolymers utilized in samples 9a, b and c, and the control sample are commercial preparations manufactured by Pittsburgh Plate Glass Co., under the trade "Selectrofoam 6002."

The hydroxy compound of the second component comprised a hydroxy terminated polyester having a hydroxyl number of 440 and a maximum acid number of 1.5. The prepolymer of the first component was prepared by reacting the same hydroxy compound utilized in the second component with toluene diisocyanate, and had an NCO equivalency (per 100 g.) of .75–.80, and an equivalent weight per NCO group of 127–133.

It is apparent that both the polyether and polyester based polyurethane foams containing the fire retardant compounds of the invention, are possessed of qualities of thermal resistance which are greatly improved over corresponding qualities in similar materials which are devoid of the fire retardant compounds. In the case of the polyether based foams a substantial improvement in fire retardancy was realized. In fact, the improvement is probably substantially greater than, and not completely delineated by the figures setting forth the mere number of exposures. For example, a sample which withstands consecutive 1, 2 and 3 second exposures to a flame without igniting, cannot be termed merely 3 times more flame retardant than a control sample which ignites during a 1 second exposure. First, the first sample has endured a total exposure of 6 seconds as compared to 1 second or less, and secondly the incidence of the support of combustion becomes greater after each second of exposure, and each period of exposure due to the heat retained by the sample, the loss of volatiles, and the like.

In the case of the polyester based foams, the improvement derived is both more extensive and more apparent. For example, while the polyether based foams exhibited the ability to delay the onset of combustion, the polyester containing foams supported combustion after prolonged exposure to the flame, extinguished such combustion and actually became noncombustible thereafter, under the conditions experienced during testing.

Accordingly, it would appear that the methods and materials of the invention are capable of yielding polyether based polyurethane foams which may be characterized as resistant to combustion or the propagation of flames, while the same methods and materials are capable of yielding polyester based polyurethane foams which may be accurately and properly classified as possessed of two phases and types of thermal resistance, in the first of which, the foams are combustible, fire retarding and self-extinguishing, and a second phase in which the foams are substantially noncombustible.

It was also found that polyurethane foams containing equivalent portions of polyester and polyether reactants yielded structures characterized by a noncombustibility similar to that experienced with the polyester based polyurethane foams, but requiring a slightly longer period before a condition of noncombustibility was achieved. The latter foams contained equal portions of the polyester and polyether compounds, and the prepolymers thereof, which were employed in samples 1–8 and 9 (a–c) respectively.

The terms "fire retardant" or "fire retarding" as employed herein in respect to the methods and materials of the invention, are intended to connote a condition in which the tendency of a material to normally be combusted and support or propagate flames under certain conditions of temperature, oxygen availability, and the like, is retarded, delayed or diminished, and may be attended by a tendency to extinguish or terminate such combustion under certain conditions.

For example, a flame retardant condition might comprise the ability to withstand longer periods of thermal exposure or higher temperatures before ignition is achieved than would be required if the factors yielding the flame retardant condition were not present. In such situations, combustion once achieved may continue without assistance until the ignited material is entirely consumed, or alternatively, ignition may be attained and some extent of combustion experienced with the combustion terminated prior to complete consumption of the ignited material.

In the latter case, involving the ability of some flame retardant materials to consecutively experience both combustion and the termination of combustion, the termination may be possible only if the factors which served to instigate ignition, e.g., the application of high temperature, are removed, but in other cases the ignited materials will exhibit an ability to quell combustion despite the fact that the applied combustion inducing factors continue to operate unabated. The latter type of combustion termination is due to properties inherent in or imparted to the ignited material, or to the side effects of such properties. For example, upon experiencing combustion the ignited material may emit gases or vapors which shield the site of combustion from the requisite oxygen, or the ignited material may contain a plurality of phases, only one of which is susceptible to ignition at the extant conditions, and combustion may be terminated upon the complete consumption of the combustible phase, to leave the remaining phases intact or uncombusted.

In terms of the foregoing definition, the polyether based polyurethane foams which are rendered "fire retardant" by means of the invention, are resistant to the propagation of combustion or flames. They are also possessed of the ability to terminate combustion in that the tested samples, after removal from the Bunsen burner flame, did cease to support combustion after a certain period. This aspect is not fully brought out by the test data embodied in FIGURE 1 since the test was discontinued whenever the combustion experienced by the samples failed to terminate within 5 seconds after withdrawal from the zone of the burner flame.

The term "noncombustible" as used throughout the specification is intended to define that condition in which the material thus described is incapable of experiencing or supporting combustion under the prescribed conditions to which it is exposed. The term is necessarily relative or comparative and is used to express a degree of resistance to combustion rather than absolute resistance under any conceivable set of conditions. For example, the polyester based foamed materials of the invention are termed noncombustible since they completely resist combustion and the propagation of flames when exposed to conditions which serve to ignite similar but unmodified foams, as represented by the control samples, which possess a lesser degree of fire retarding capacity and do support combustion. In applying the term "noncombustible" to the polyester based foams of the invention, it must be realized that the absolute resistance apparently expressed by the term is in fact limited to the thermal conditions prescribed, and demonstrated as being capable of supporting combustion in similar but unmodified foams, and that the inventive materials are not initially noncombustible within the prescribed definition, but instead derive this valuable quality after undergoing some degree of combustion.

The foregoing fire retardancy tests and definitions have been derived in order to provide a demonstrable basis for the illustration of improvements achieved in an area which is in great need of such improvements, and simultaneously devoid of definitive terms and limits of the desired improvements and of methods for their determination. Thus, while the tests employed may conceivably fall short of the provision of an exact demonstration of the translation of such improvements into a perspective which delineates the full extent and all practical ramifications of the improvements, the comparison of the properties of the inventive materials with those of materials devoid of the inventive contribution, is more than adequate to illustrate both the quantitative extent and the corresponding value of the improvement in fire retardancy which is achieved.

However, in order to apprehend the full extent of the present improvement, the showing of improved thermal resistance must be considered jointly with the fact that the improvement is not attended by a simultaneous diminution or adulteration of other desirable and requisite properties of polyurethane resin foams. In addition to the previously discussed moisture resistance, the materials and methods of the invention do not result in the loss of processing efficiency or attributes, or of other desirable qualities of the ultimate product. Specifically, the ease of admixing the ingredients of the foams and the stability and foaming qualities of the admixture are not noticeably affected. Furthermore, the products derived are free from mechanical weakness, unusual friability, undesirable cell sizes, the lack of homogeneity, excessive, inadequate or random occurrence of cells or voids, lack of control of the final product density, or the like. These factors are particularly important in view of the fact that the failure of prior attempts to remedy the problem of polyurethane flammability were principally the result of their inability to achieve both flame retardancy and the maintenance of previously existing desirable qualities of the resins.

IV. PREPARATION OF HALOALKYL PHOSPHATE ALKANOLAMINE SALTS

While the flame retardant compounds of the invention generally comprise the reaction products of organophosphorus and amino compounds, the preferred compositions are haloethyl phosphate alkanolamine salts and particularly the bromo and chloroalkyl salts such as the chloroethyl phosphate ethanolamine salt.

The haloalkyl alkanol compounds are liquids prepared by the following general reaction:

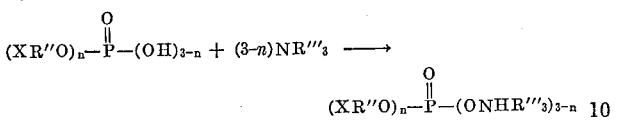

in which X is halogen, R'' is a divalent hydrocarbon radical, R''' is alkanol or hydrogen with at least one R''' being alkanol, and $n$ is an integer having a value of 1 or 2. By this reaction, the selection of the appropriate reactants may yield salts containing 1 or 2 amino groups which may contain 1, 2 or 3 alkanol groups, and also contains 1 or 2 haloalkyl groups.

Specific examples of the preparation of haloalkyl phosphate alkanol amine salts are yielded by the following examples:

Example 1

Equivalent weights of chloroethyl acid phosphate and diethanolamine were reacted by placing the solvent free chloroethyl acid phosphate in a flask positioned in a cold water bath and adding the diethanolamine dropwise, with stirring over a period of 1 hour while maintaining the temperature of the contents of the flask below 40° C. The resultant salt possessed a pH of 6.8. The amine:acid equivalent ratio was 1 and the equivalent weight of the chloroethyl acid phosphate as derived from the acid number was 160.

To insure correct stoichiometry, the acid number of the chloroethyl acid phosphate was determined and the equivalent weight calculated therefrom. It is probable that the haloalkyl acid phosphate ester was actually an admixture of mono- and di-haloalkyl esters, since the ester was prepared by reacting phosphorus pentoxide and chloroethanol in a 1:3 molar ratio and a theoretical yield comprising a 1:1 molar ratio of the mono- and di-esters should have resulted. It is even conceivable that extremely minor amounts of the tri-ester and of phosphoric acid may have been yielded.

Example 2

The method of Example 1 was repeated with equivalent weights of chloroethyl acid phosphate and triethanolamine to yield a salt possessing a trialkanol substitution of the nitrogen atom and having a pH of 7.3. The amine:acid equivalent ratio was 1 and the equivalent weight of the chloroethyl acid phosphate as calculated from the acid number was 133.

As previously stated, the nature of the halogen compound, the specific divalent hydrocarbon group and the length and number of the alkanol substituents may be varied. It should also be noted that the fire retardancy of the compounds of the present invention may be imparted to materials other than polyurethane foams in which fire retardancy is desired and the compatibility or reactivity of the present compounds renders them highly suitable. For example, the compounds of the invention may impart desirable characteristics to foams formed from styrene, vinyl compounds, phenolic resins, polyolefins, silicones and cellulosic materials.

In summation, it is apparent that the present invention provides cellular compositions having unusual properties of flame or fire resistance without the sacrifice of other desirable properties of the compositions, due to the incorporation of flame retardant compounds, and also provides methods for the preparation of these improved, modified cellular compositions and the flame retardant compounds which are utilized in their modification.

It is further obvious that various changes, alterations and substitutions may be made in the compositions, methods and products of the invention, without departing from the spirit of the invention as defined by the following claims.

We claim:

1. A method for preparing fire retardant cellular structures comprising combining an organic phosphate amine salt of the formula:

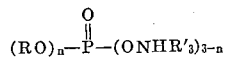

in which R is selected from the group consisting of alkyl, cycloalkyl, aryl, aralkyl, haloalkyl and haloaryl, R' is selected from the group consisting of hydroxy alkyl, alkyl and hydrogen, and $n$ is an integer having a value of 1 to 2, with a reactive admixture of an organic polyisocyanate, a compound having at least two active hydrogens selected from the group consisting of polyesters and polyethers, and a blowing agent, and reacting and expanding said admixture to a cellular condition.

2. A method as claimed in claim 1 in which said organic phosphate amine salt is chloroethyl phosphate ethanolamine salt.

3. A fire retardant cellular structure consisting essentially of the expanded reaction product of an organic polyisocyanate, a compound having at least two active hydrogens selected from the group consisting of polyesters and polyethers, a blowing agent, and an organic phosphate amine salt of the formula:

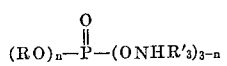

in which R is selected from the group consisting of alkyl, cycloalkyl, aryl, aralkyl, haloalkyl, and haloaryl, R' is selected from the group consisting of hydroxy alkyl, alkyl and hydrogen, and $n$ is an integer having a value of 1 to 2.

4. A fire retardant cellular structure as claimed in claim 3 in which said organic phosphate amine salt is chloroethyl phosphate ethanolamine salt.

References Cited by the Examiner

UNITED STATES PATENTS

| | | | |
|---|---|---|---|
| 2,193,965 | 3/1940 | Hochwalt | 260—461 |
| 2,653,113 | 9/1953 | Banigan | 260—461 |
| 2,903,393 | 9/1959 | Allen et al. | 260—461 |
| 3,076,010 | 1/1963 | Beck et al. | 260—2.5 |

DONALD E. CZAJA, *Primary Examiner.*

WILLIAM H. SHORT, *Examiner.*